US009262892B2

(12) United States Patent
Marks

(10) Patent No.: US 9,262,892 B2
(45) Date of Patent: Feb. 16, 2016

(54) GAMING SYSTEM AND METHOD OF GAMING

(71) Applicant: Aristocrat Technologies Australia Pty Limited, North Ryde (AU)

(72) Inventor: Daniel Marks, Decatur, GA (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/924,384

(22) Filed: Jun. 21, 2013

(65) Prior Publication Data

US 2014/0364192 A1 Dec. 11, 2014

(30) Foreign Application Priority Data

Jun. 11, 2013 (AU) ................................ 2013206253

(51) Int. Cl.
*A63F 13/00* (2014.01)
*G07F 17/34* (2006.01)
*G07F 17/32* (2006.01)

(52) U.S. Cl.
CPC .............. *G07F 17/34* (2013.01); *G07F 17/326* (2013.01)

(58) Field of Classification Search
CPC ... G07F 17/32; G07F 17/326; G07F 17/3262; G07F 17/34
USPC ...................................................... 463/20, 21
See application file for complete search history.

(56) References Cited

U.S. PATENT DOCUMENTS

| | | | |
|---|---|---|---|
| 4,198,052 | A | 4/1980 | Gauselmann |
| 4,836,546 | A | 6/1989 | DiRe et al. |
| 4,874,173 | A | 10/1989 | Kishishita |
| 5,102,134 | A | 4/1992 | Smyth |
| 5,308,065 | A | 5/1994 | Bridgeman et al. |
| 5,332,228 | A | 7/1994 | Schultz |
| 5,373,440 | A | 12/1994 | Cohen et al. |
| 5,393,061 | A | 2/1995 | Manship et al. |
| 5,449,173 | A | 9/1995 | Thomas et al. |

(Continued)

FOREIGN PATENT DOCUMENTS

| | | |
|---|---|---|
| GB | 2 130 413 | 5/1984 |
| NZ | 510297 | 8/2002 |

(Continued)

OTHER PUBLICATIONS

Office Action dated Sep. 26, 2012 corresponding to U.S. Appl. No. 13/450,117.

(Continued)

*Primary Examiner* — Allen Chan
(74) *Attorney, Agent, or Firm* — McAndrews, Held & Malloy, Ltd.

(57) ABSTRACT

A gaming system is disclosed that comprises a symbol selector arranged to select a plurality of base symbols from a set of base symbols for display in a display area; and at least one set of additional symbols, each set of additional symbols including a plurality of additional symbols. The gaming system is arranged to incorporate the additional symbols of an additional symbol set into the base symbol set so as to define a combined symbol set, and the gaming system is arranged to select and display a plurality of base and/or additional symbols from the combined symbol set. The gaming system further comprises an outcome evaluator arranged to determine a game outcome based on the selected base and/or additional symbols.

41 Claims, 8 Drawing Sheets

(56) References Cited

U.S. PATENT DOCUMENTS

| | | | |
|---|---|---|---|
| 5,647,798 A | | 7/1997 | Falciglia |
| 5,697,843 A | | 12/1997 | Manship et al. |
| 5,704,835 A | | 1/1998 | Dietz, II |
| 5,722,891 A | * | 3/1998 | Inoue .............................. 463/20 |
| 5,725,428 A | | 3/1998 | Achmüller |
| 5,816,916 A | | 10/1998 | Moody |
| 5,823,873 A | | 10/1998 | Moody |
| 5,823,874 A | | 10/1998 | Adams |
| 5,848,932 A | | 12/1998 | Adams |
| 5,890,962 A | | 4/1999 | Takemoto |
| 5,947,820 A | | 9/1999 | Morro et al. |
| 5,947,821 A | | 9/1999 | Stone |
| 5,980,384 A | | 11/1999 | Barrie |
| 5,997,401 A | | 12/1999 | Crawford |
| 6,004,208 A | | 12/1999 | Takemoto et al. |
| 6,053,813 A | | 4/2000 | Mathis |
| 6,059,289 A | | 5/2000 | Vancura |
| 6,089,977 A | | 7/2000 | Bennett |
| 6,102,798 A | | 8/2000 | Bennett |
| 6,120,031 A | | 9/2000 | Adams |
| 6,120,378 A | | 9/2000 | Moody et al. |
| 6,126,542 A | | 10/2000 | Fier |
| 6,159,097 A | | 12/2000 | Gura |
| 6,159,098 A | | 12/2000 | Slomiany et al. |
| 6,168,520 B1 | | 1/2001 | Baerlocher et al. |
| 6,190,255 B1 | | 2/2001 | Thomas et al. |
| 6,200,217 B1 | | 3/2001 | Osawa |
| 6,227,971 B1 | | 5/2001 | Weiss |
| 6,234,897 B1 | | 5/2001 | Frohm et al. |
| 6,251,013 B1 | | 6/2001 | Bennett |
| 6,296,251 B1 | | 10/2001 | Webb |
| 6,319,124 B1 | | 11/2001 | Baerlocher et al. |
| 6,398,218 B1 | | 6/2002 | Vancura |
| 6,439,993 B1 | | 8/2002 | O'Halloran |
| 6,544,120 B2 | | 4/2003 | Ainsworth |
| 6,632,140 B2 | | 10/2003 | Berman et al. |
| 7,121,942 B2 | | 10/2006 | Baerlocher |
| 8,360,840 B2 | | 1/2013 | Bennett |
| 8,529,332 B2 | | 9/2013 | Bennett et al. |
| 2002/0132659 A1 | | 9/2002 | DeMar et al. |
| 2009/0298573 A1 | * | 12/2009 | Bramble ......................... 463/20 |
| 2010/0004049 A1 | * | 1/2010 | Ching et al. .................... 463/20 |
| 2012/0122547 A1 | * | 5/2012 | Aoki et al. ...................... 463/20 |

FOREIGN PATENT DOCUMENTS

| | | |
|---|---|---|
| WO | 97/27569 | 7/1997 |
| WO | 00/32286 | 6/2000 |
| WO | 02/07836 | 1/2002 |

OTHER PUBLICATIONS

Office Action dated Dec. 7, 2012 corresponding to U.S. Appl. No. 13/450,117.

Office Action dated Jun. 17, 2015 corresponding to U.S. Appl. No. 13/450,117.

* cited by examiner

GAMING SYSTEM AND METHOD OF GAMING

RELATED APPLICATIONS

This application claims priority to Australian Patent Application No. 2013206253 having an International filing date of Jun. 11, 2013, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

It is known to provide a gaming system arranged to implement a probabilistic type game wherein game outcomes are randomly determined and an award is provided to a player if a game outcome occurs that corresponds to a defined winning outcome.

Such gaming systems may commonly be implemented as a stepper machine provided with symbol bearing reels, or a video machine wherein selected symbols are displayed on virtual reels on a graphical display device.

However, while such gaming systems provide users with enjoyment, a need exists for alternative gaming systems in order to maintain or increase player enjoyment.

BRIEF SUMMARY OF THE INVENTION

In accordance with a first aspect of the present invention, there is provided a gaming system comprising:

a symbol selector arranged to select a plurality of base symbols from a set of base symbols for display in a display area; and at least one set of additional symbols, each set of additional symbols including a plurality of additional symbols;

the gaming system being arranged to incorporate the additional symbols of an additional symbol set into the base symbol set so as to define a combined symbol set; and the gaming system arranged to select and display a plurality of base and/or additional symbols from the combined symbol set; and the gaming system further comprising an outcome evaluator arranged to determine a game outcome based on the selected base and/or additional symbols.

In an embodiment, the additional symbols of the additional symbol set are randomly determined.

In an embodiment, the additional symbols of the additional symbol set are determined according to one or more game conditions.

In an embodiment, the additional symbols of the additional symbol set are determined according to a wager amount.

In an embodiment, the additional symbol set includes a plurality of different symbol types.

In an embodiment, the additional symbol set includes a plurality of symbol groups, each symbol group being associated with a symbol reel, and each symbol group including one or more of the same additional symbol.

In an embodiment, at least one symbol group includes a plurality of a first symbol type, and at least one other symbol group includes a plurality of a second symbol type.

In an embodiment, at least some symbol groups include differing numbers of additional symbols.

In an embodiment, the additional symbols in the additional symbol set are defined according to desired conditional probability chains between symbol groups that produce desired win probability outcomes.

In an embodiment, the system is arranged to incorporate the additional symbols into the base symbol set by adding the additional symbols of an additional symbol set to the base symbol set.

In an embodiment, each additional symbol added to the base symbol set is disposed between 2 base symbols in the base symbol set.

In an embodiment, the additional symbol set comprises a symbol pattern defining type and number of additional symbols and intended location of additional symbols relative to the base symbol set.

In an embodiment, the system comprises a plurality of additional symbol sets, each additional symbol set comprising a different symbol pattern, and the gaming system is arranged to select at least one of the additional symbol sets and thereby define the additional symbols to be incorporated into a base symbol set.

In an embodiment, at least some of the plurality of additional symbol sets correspond to different win outcome probabilities.

In an embodiment, the gaming system is arranged to randomly select an additional symbol set from the plurality of additional symbol sets.

In an embodiment, the gaming system is arranged to select an additional symbol set from the plurality of additional symbol sets using a weighted table.

In an embodiment, the system includes a plurality of weighted tables, and the gaming system is arranged to select one of the weighted tables to use during implementation of a game.

In an embodiment wherein a plurality of games are implemented by the gaming system, the gaming system may be arranged to select a first weighted table to use for a first game, and to select at least one different weighted table for use in subsequent games.

In an embodiment, the gaming system is arranged to implement a base game using the base symbol set, and to implement a feature game wherein the additional symbols of an additional symbol set are incorporated into the base symbol set so as to define a combined symbol set, and the gaming system is arranged to select and display a plurality of base and/or additional symbols from the combined symbol set.

In accordance with a second aspect of the present invention, there is provided a gaming system comprising:

a symbol selector arranged to select a plurality of base symbols from a set of base symbols for display in a display area;

the set of base symbols including a set of removable symbols;

the gaming system being arranged to remove the removable symbols of a removable symbol set from the base symbol set so as to define a modified symbol set; and the gaming system arranged to select and display a plurality of base symbols from the modified symbol set; and the gaming system further comprising an outcome evaluator arranged to determine a game outcome based on the selected base symbols.

In an embodiment, the removable symbols of the removable symbol set are randomly determined.

In an embodiment, the removable symbols of the removable symbol set are determined according to one or more game conditions.

In an embodiment, the removable symbols of the removable symbol set are determined according to a wager amount.

In an embodiment, the removable symbol set includes a plurality of different symbol types.

In an embodiment, the removable symbols in the removable symbol set are defined according to desired conditional probability chains between symbol groups that produce desired win probability outcomes.

In an embodiment, the removable symbol set comprises a symbol pattern defining type and number of removable symbols and location of removable symbols relative to the base symbol set.

In an embodiment, the system comprises a plurality of removable symbol sets, each removable symbol set comprising a different symbol pattern, and the gaming system is arranged to select at least one of the removable symbol sets and thereby define the removable symbols to be removed from the base symbol set.

In an embodiment, at least some of the plurality of removable symbol sets correspond to different win outcome probabilities.

In an embodiment, the gaming system is arranged to randomly select a removable symbol set from the plurality of removable symbol sets.

In an embodiment, the gaming system is arranged to select a removable symbol set from the plurality of removable symbol sets using a weighted table.

In an embodiment, the system includes a plurality of weighted tables, and the gaming system is arranged to select one of the weighted tables to use during implementation of a game.

In accordance with a third aspect of the present invention, there is provided a method of gaming comprising:

selecting a plurality of base symbols from a set of base symbols for display in a display area;

providing at least one set of additional symbols, each set of additional symbols including a plurality of additional symbols;

incorporating the additional symbols of an additional symbol set into the base symbol set so as to define a combined symbol set;

selecting and displaying a plurality of base and/or additional symbols from the combined symbol set; and determining a game outcome based on the selected base and/or additional symbols.

In accordance with a fourth aspect of the present invention, there is provided a method of gaming comprising:

selecting a plurality of base symbols from a set of base symbols for display in a display area, the set of base symbols including a set of removable symbols;

removing the removable symbols of a removable symbol set from the base symbol set so as to define a modified symbol set;

selecting and displaying a plurality of base symbols from the modified symbol set; and determining a game outcome based on the selected base symbols.

In accordance with a fifth aspect of the present invention, there is provided a computer readable data storage device having a computer readable program code embodied therein for causing a computer to operate in accordance with the gaming system of the first aspect.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
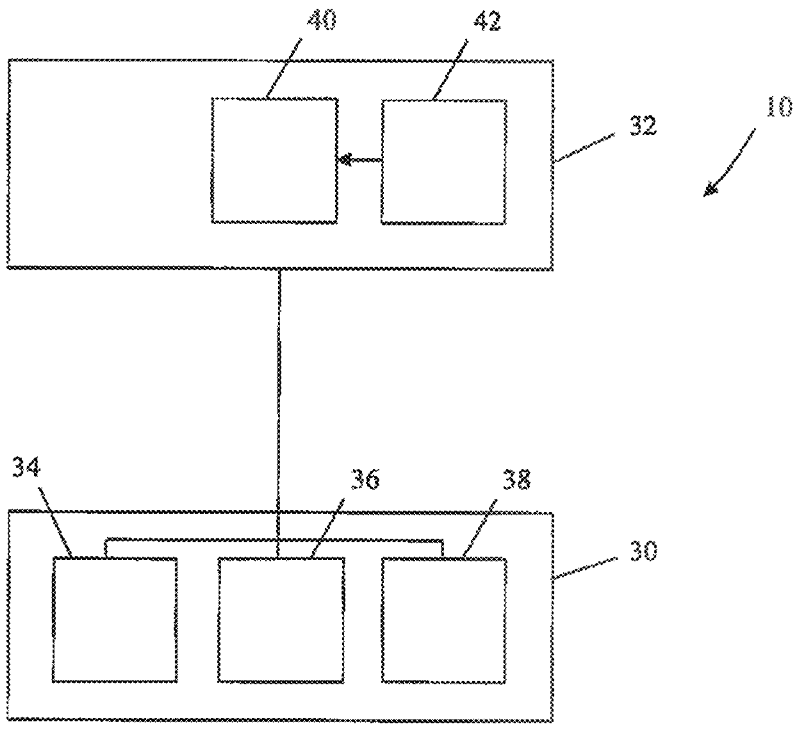
FIG. 1 is a schematic block diagram of components of a gaming system in accordance with an embodiment of the present invention.

The present gaming system implements a probabilistic type game, in this example of a type wherein a plurality of symbols are selected and displayed in a plurality of display positions, and game outcomes are determined on the basis of the symbols displayed.

In one conventional type of gaming machine, a spinning reel type game comprises a display area including 15 display positions, with each display position including one symbol. The display positions are arranged in five vertically disposed reels, with each reel corresponding to a display position group, and each reel having three visible display positions. After the reels are spun and subsequently stopped, the display positions show a random selection of symbols.

Generally, with such games, a plurality of win patterns in the form of win lines are defined which extend across the reels and include one display position from each reel.

Typically the symbols that are disposed in a win line are compared with winning symbol combinations defined in a pay table so as to determine whether a player of the game should receive an award. For example, if winning symbol combinations are based on poker hands, a particular prize would be awarded if the win line comprises four aces.

Other winning symbol combinations and corresponding prizes may also be defined.

The gaming system is arranged such that at least during implementation of a feature game, the gaming system including a modified pool of available symbols from which symbols for display are selected, the modified symbol pool defines a combined set of symbols including one or more base symbols, for example also used during a base game, and a set of additional symbols, in this example in the form of a defined pattern of additional symbols selected from a plurality of symbol patterns. The base symbols may be associated with multiple symbol groups, such as multiple symbol reels of a spinning reel type game, and each of the base symbols may be associated with a defined location on a particular reel. In an embodiment, the additional symbols of a symbol pattern correspond to defined locations such that when a symbol pattern is selected, the additional symbols of the selected symbol pattern are added to the base symbols and positioned between defined base symbols on the reels.

In this way, a new combined set of symbols is defined that includes the existing base symbols and the additional symbols disposed at defined positions between the base symbols.

The symbol patters may be randomly selected, selected based on game outcomes or conditions, or selected in any other way.

The selectable symbol patterns may define different types of additional symbols, different numbers of additional symbols, different intended distributions of additional symbols relative to the existing base symbols, or the symbol patterns may differ in any other way.

For example, a first symbol pattern may define 20 additional symbols to be added to base symbols of a first symbol reel, 30 additional symbols to be added to base symbols of a second symbol reel, 40 additional symbols to be added to base symbols of a third symbol reel, 25 additional symbols to be added to base symbols of a fourth symbol reel, and 20 additional symbols to be added to base symbols of a fifth symbol reel. Other symbol patterns may define different numbers of additional symbols to be added to the respective symbol reels.

In a further example, the additional symbols to be added to each reel may be the same or different. In one particular embodiment, the additional symbols to be added to at least one of the reels, such as the first, second, fourth and fifth reels, may be the same, and the additional symbols added to at least one of the other reels, such as the third reel, may be the same but different to the symbols added to the first, second, fourth and fifth reels. In this way, by adding many symbols of the same type to more than one reel, the likelihood of a winning outcome significantly increases.

Alternatively, an embodiment may be implemented wherein a symbol pattern defines symbols to be added such that for at least some of the reels, additional symbols of differing type are to be added to the reel.

In one embodiment, the number, type and distribution of additional symbols in a symbol pattern may be variable and may for example depend on any factor such as the wager amount. The additional symbols added to the base symbols may remain for any number of games.

The symbol patterns may be defined with reference to desired conditional probability chains that produce desired win probability outcomes. For example, in one particular example, a symbol pattern may be defined such that for a first reel a defined symbol is associated with an 80% probability of selecting the same defined symbol for a second reel; if first and second reels display the defined symbol, then a 5% change exists of selecting the defined symbol on a third reel; and if the third reel dot match the second reel, then a 100% change is defined form selecting a defined symbol for fourth and fifth reels.

It will be understood that the different symbol patterns may correspond to differing win outcome probabilities such that selection of a symbol pattern in part defines the win outcome probability of a game.

In an embodiment, the patterns are selected using a weighted table that defines the relative likelihood of selection of each of the symbol patterns.

In one particular implementation, the weighted table may define that a first symbol pattern is associated with a range of numbers between 1 and 10, a second symbol pattern is associated with a range of numbers between 11 and 30, a third symbol pattern is associated with a range of numbers between 31 and 60, and a fourth symbol pattern is associated with a range of numbers between 61 and 100. By pseudo randomly selecting a number between 1 and 100, a symbol pattern may then be selected, with the likelihood of selecting the fourth symbol pattern being the highest and the likelihood of selecting the first symbol pattern being the lowest.

In a further embodiment, a plurality of weighted tables may be provided and different weighted tables used, for example depending on the particular game being implemented, or based on a pseudo random selection.

For example, a first implemented game may use a defined first weighted table, a second free game may use a defined second weighted table, and so on.

In a further example, the weighted t able to use, or a pool of weighted tables from which a weighted table to use is selected, may depend on other factors, such as a wager amount, whether an ante bet has been wagered.

Referring to FIG. 1 of the drawings, there is shown a schematic block diagram of components of a gaming system 10 arranged to implement a probabilistic game of the type wherein several symbols from a set of symbols are randomly displayed, and a game outcome is determined on the basis of the displayed symbols. The system is of the type including multiple game modes, such as normal game mode wherein a base game is implemented and special game mode wherein a feature game is implemented.

The components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
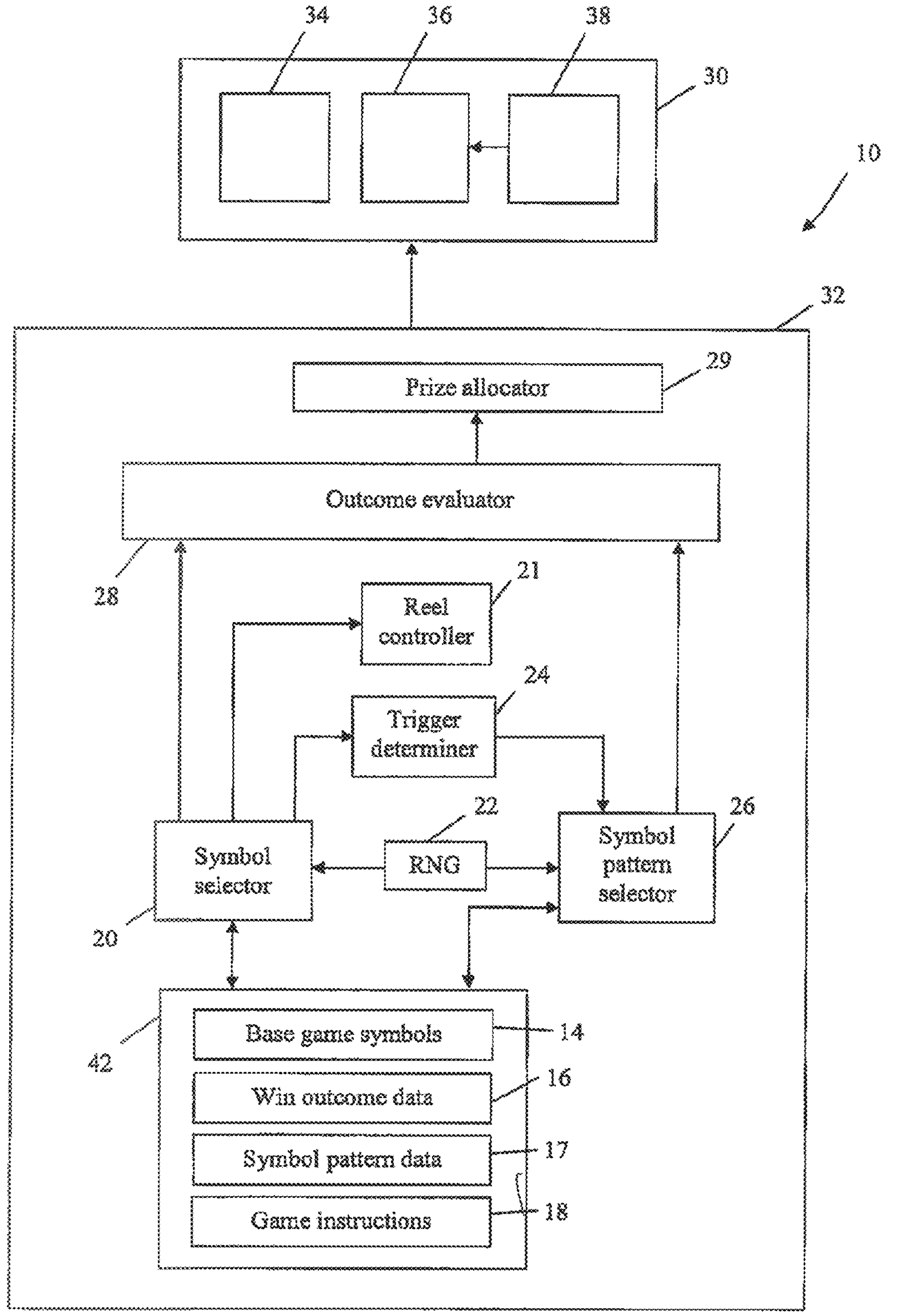
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of selectable symbols, win outcome data 16 indicative of win condition requirements for games implemented by the system, symbol pattern data 17 indicative of additional symbol sets, and game instruction data 18 indicative of game instructions usable by the gaming machine 10 to control operation of the games implemented by the gaming system.

The game controller 32 includes a symbol selector 20 which is arranged, during a base game, to select several base symbols from a set of available symbols 14 for display to a player in a plurality of display positions on a plurality of reels. In this example, the base symbols 14 are associated with a plurality of reels and a reel controller 21 arranged to control spinning and stopping of the reels is provided so that the reels stop with the selected symbols displayed. In this example, the symbol selection carried out by the symbol selector 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

In the present embodiment wherein a base game and a feature game are implemented, the game controller 32 includes a trigger determiner 24 arranged to determine whether a trigger condition exists, for example a defined symbol combination during a base game, and to instigate a feature game when such a trigger condition is detected.

The game controller 32 also includes a symbol pattern selector 26 arranged to select a symbol pattern from the plurality of symbol patterns 17 stored in the memory 42.

The selected symbol pattern is then added to the set of base symbols 14 to define a combined set of symbols for use during the feature game. Each symbol pattern defines the additional symbols that are to be added to the base symbols 14, in this example in order to define new reel strips and the locations of the additional symbols relative to the base symbols 14 on the reel strips.

In this example, the symbol pattern selection carried out by the symbol pattern selector 26 is made using a random number generator 22.

The game controller 32 also comprises an outcome evaluator 28 which, in accordance with the game instructions 18, determines game outcomes, in this example based on the symbols selected for display to the player by the symbol selector 20.

The game controller 32 also comprises a prize allocator 29 arranged to allocate a prize to a player when a winning outcome exists.

In the present embodiment, the game implementer 20, the reel controller 21, the trigger determiner 24, the symbol pattern selector 26, the outcome evaluator 28, and the prize allocator 29 are at least partly implemented using the processor 40 and associated software although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device.

For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
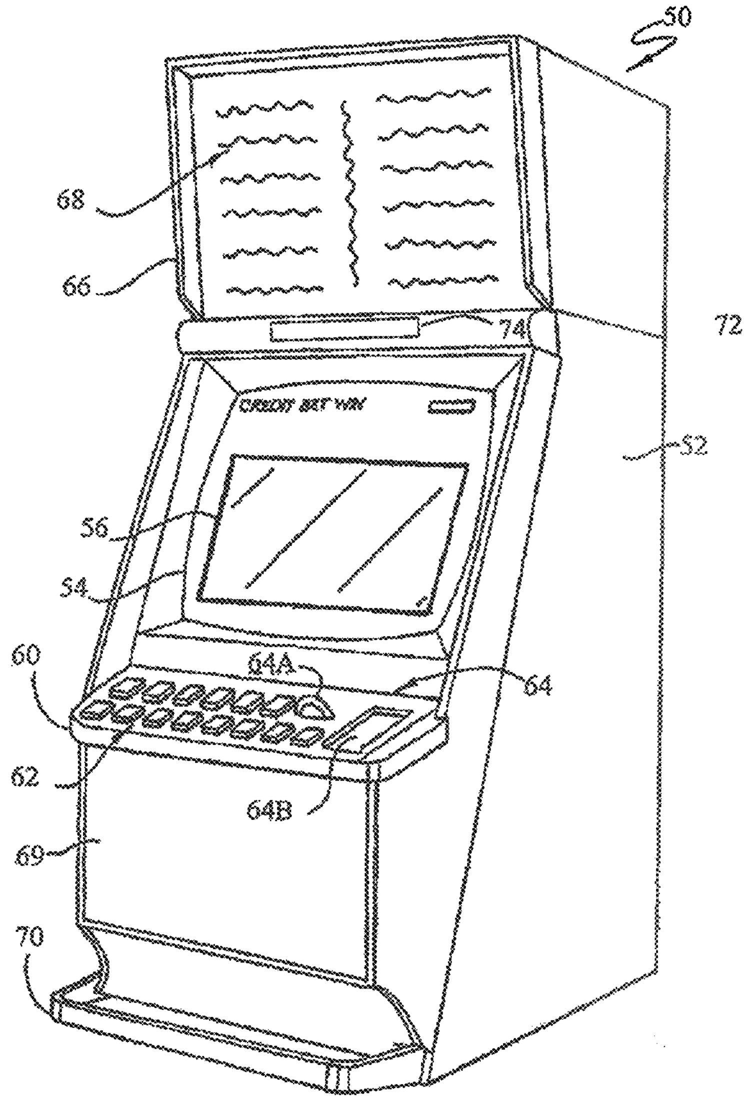
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display device 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The top box 66 may also include a display, for example a video display unit, which may be of the same type as the display device 54, or of a different type.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
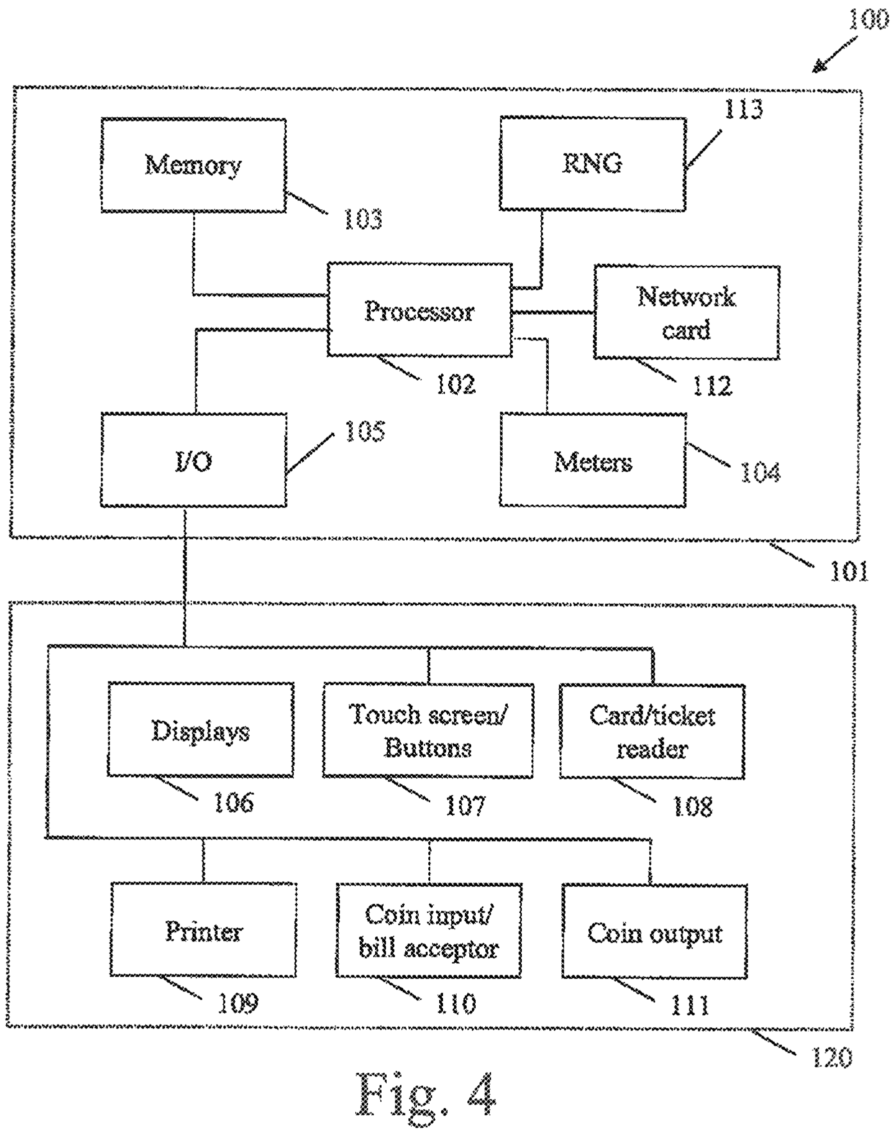
FIG. 4 is a schematic block diagram of operative components of the gaming machine shown in FIG. 3.
Figure 5:
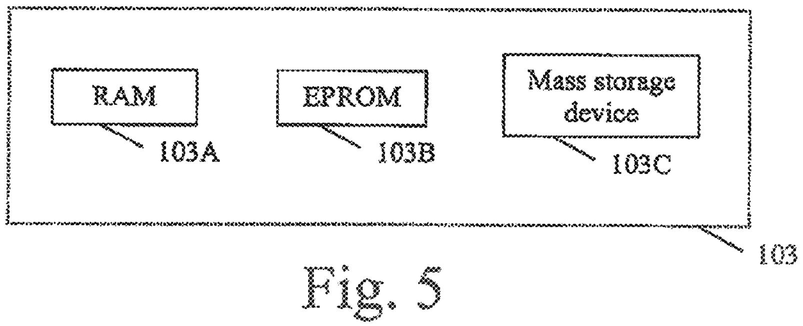
FIG. 5 is a schematic block diagram of components of a memory of the gaming machine shown in FIG. 3.

FIG. 4 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 6:
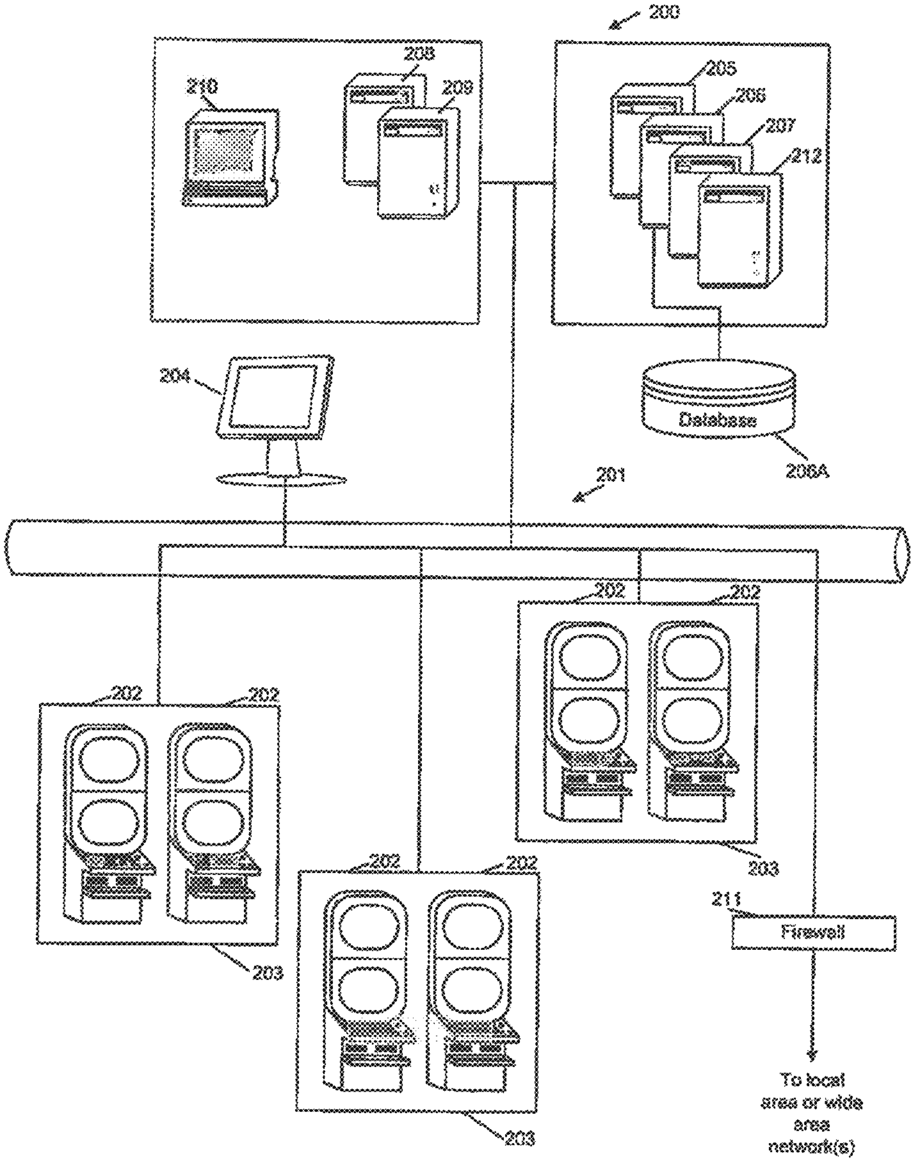
FIG. 6 is a schematic diagram of a gaming system in accordance with an alternative embodiment of the present invention wherein the gaming system is implemented over a network.

FIG. 6 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface *IOS for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102**.

In the example shown in FIG. 4, the peripheral devices that communicate with the game controller 101 comprise one or more displays 106; a touch screen and/or bank of buttons 107 including at least one input device, such as at least one button; a card and/or ticket reader 108; a printer 109; a bill acceptor and/or coin input mechanism 110; and a coin output mechanism 111. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines.

The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine.

Alternatively, a separate random number generator server could be provided.

Examples of specific implementations of the gaming system will now be described in relation to a stand alone gaming machine 50 although it will be understood that implementation may also be carried out using other gaming system architectures such as a network architecture of the type shown in FIG. 6.

In the present embodiment, the gaming system is operable in normal game mode wherein a base game is implemented and special game mode wherein a feature game is implemented. Special game mode may comprise one or more free games.

Special game mode commences when a trigger condition is detected, such as display of a particular special symbol, display of a defined combination of symbols, based on other game outcomes determined by the gaming system, or may be prompted by a player pressing a button on the gaming system 10 after the player has identified that a game outcome corresponding to special game mode requirements has occurred.

The gaming system 10 may also be arranged so as to determine eligibility for special game mode, for example based on the amount or type of bet placed, based on particular time periods and so on.

Special game mode may also be arranged to commence when a special game is purchased by a player.

Figure 7:
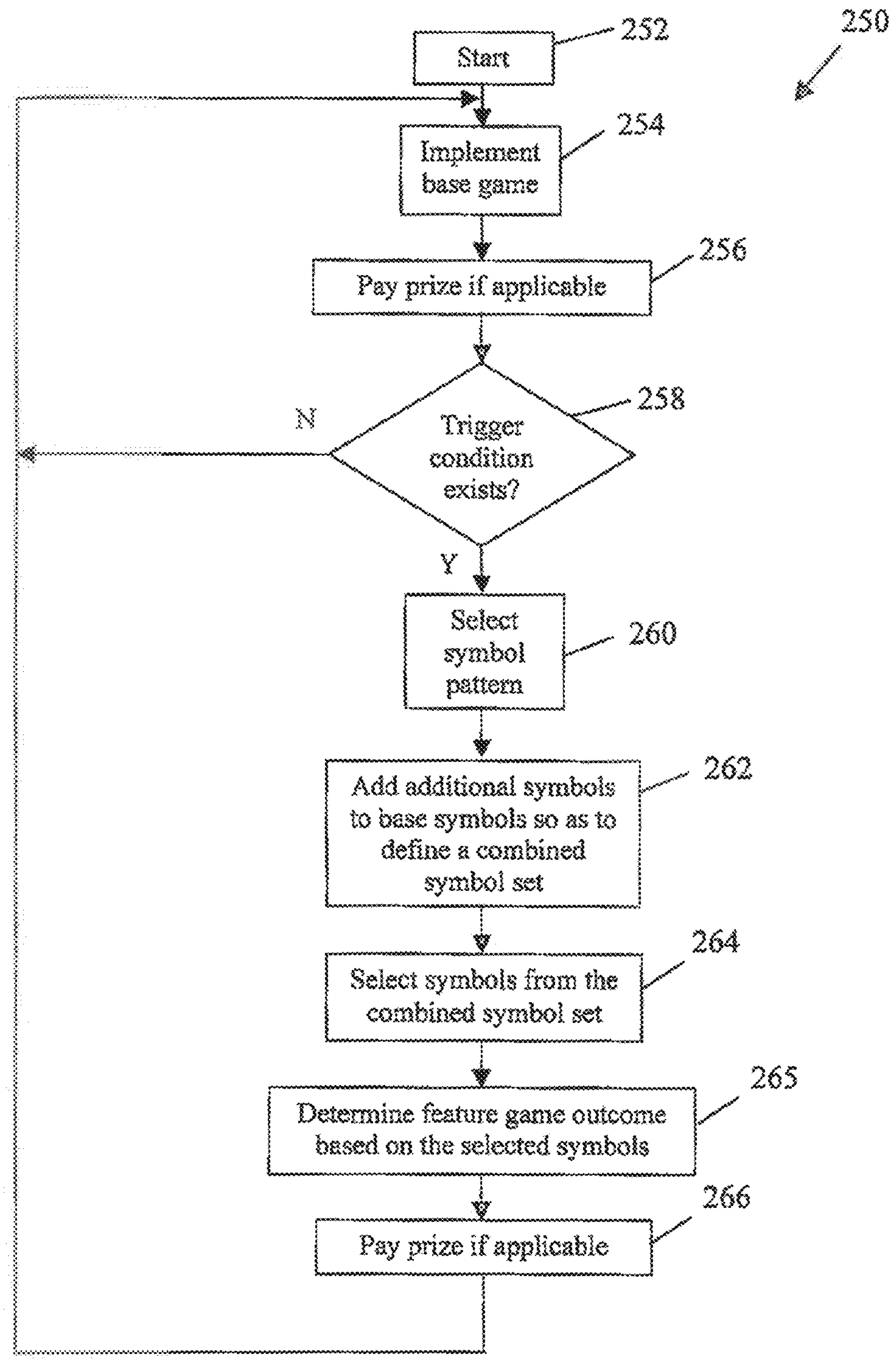
FIG. 7 is a flow diagram illustrating game play of a gaming system in accordance with an embodiment of the present invention.
Figure 8:
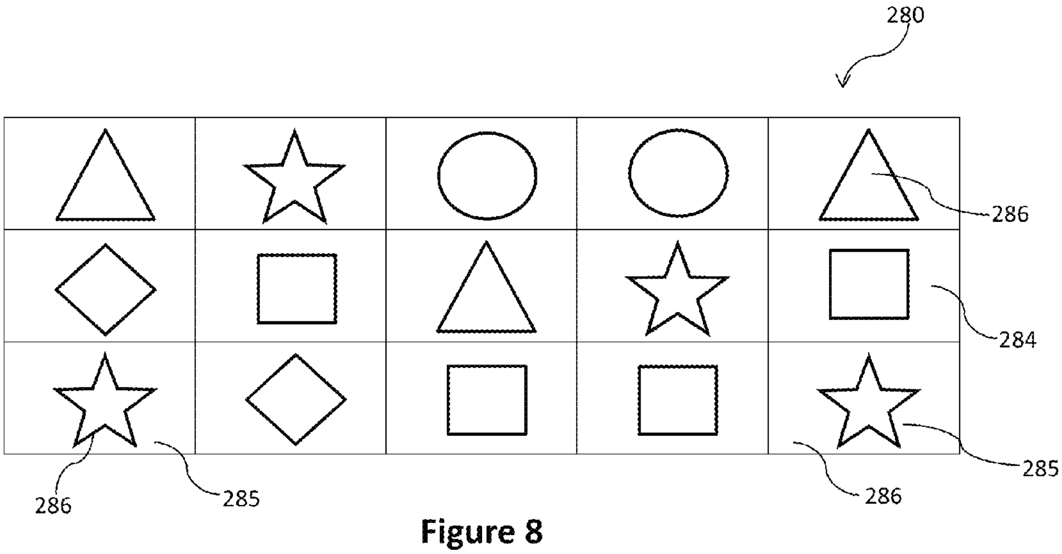
FIG. 8 is a diagrammatic representation of example symbols displayed to a player during implementation by the gaming system of a base game.

Specific examples will now be described in relation to flow diagram 250 shown in FIG. 7, which illustrates steps 252 to 264 of a method of gaming implemented by the gaming system according to the present embodiment, and FIGS. 8 to 10.

In this example, the gaming system comprises 5 reels 280 arranged to display standard symbols and one or more function symbols at respective display positions 285 in a display area 284 during implementation of a base game.

Win outcomes are determined on the basis of the base symbols 286 visible at the display positions 285 when the reels stop.

Typically, a player will purchase or otherwise obtain win entitlements such as several win lines which are used in the game to determine win outcomes. If the displayed base symbols 286 on the reels 280 have symbols associated with a winning combination such as a winning combination disposed on a win line, the player wins a prize.

During normal game mode, the set of base symbols 14 are used to define respective reel strips associated with the reels, and the symbol selector 20 selects base symbols from each of the reel strips to be displayed in the display area 284, in the present example by selecting stopping positions of the 5 reels 280. The reels then spin and are subsequently controlled by the reel controller 21 to stop such that selected base symbols 286 are displayed, as shown in FIG. 8. The displayed selected base symbols 286 are then evaluated by the outcome evaluator 28 and if the displayed base symbols 286 correspond to a winning outcome, a prize is awarded by the prize allocator 29.

If a trigger condition exists, for example if one or more defined base symbols are displayed, the trigger determiner 24 identifies the trigger condition and instigates special game mode wherein at least one feature game is implemented. During a feature game, a set of additional symbols is selected, and in this example at least one symbol pattern is selected from a plurality of symbol patterns, each symbol pattern including additional symbols that are to be added to the base symbols during the feature game in order to define a new combined set of selectable symbols.

Figure 9:
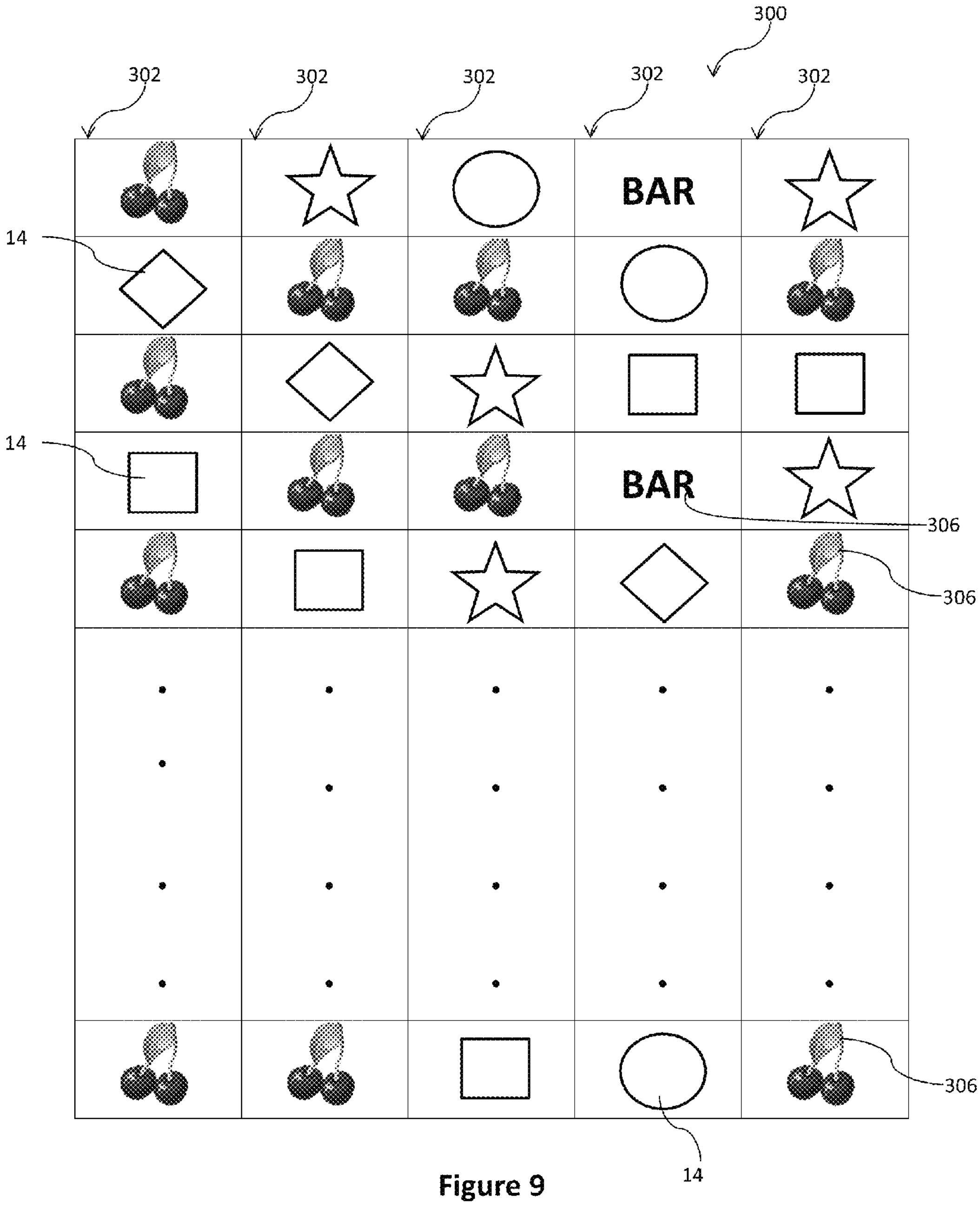
FIG. 9 is a diagrammatic representation of an example selectable symbol pattern.

A representation of a symbol pattern 300 for use during implementation of a feature game is shown in FIG. 9.

Each column 302 of the symbol pattern 300 corresponds to a symbol strip of a reel 280, and each symbol strip includes feature game symbols 306 that are intended to be added to the base symbols 14 of a relevant reel 302. Each symbol pattern 300 also defines the respective positions on the reels 302 at which the additional symbols are to be added.

In the present example, the symbol pattern 300 also includes information indicative of the distribution of the base symbols 14 on the reels 280 by representing the base symbols 14 in the symbol pattern 300.

Selection of a symbol pattern by the symbol pattern selector 26 causes the feature symbols 306 of the symbol pattern 300 to be added to the base symbols 14 thereby defining a new combined set of selectable symbols.

In the present embodiment, each feature symbol 306 is added such that the feature symbol 306 is disposed between 2 base symbols 14, although it will be understood that other arrangements are possible.

For example, instead of disposing the feature symbols at defined locations, such as between existing base symbols, the locations for the feature symbols may be randomly selected.

Figure 10:
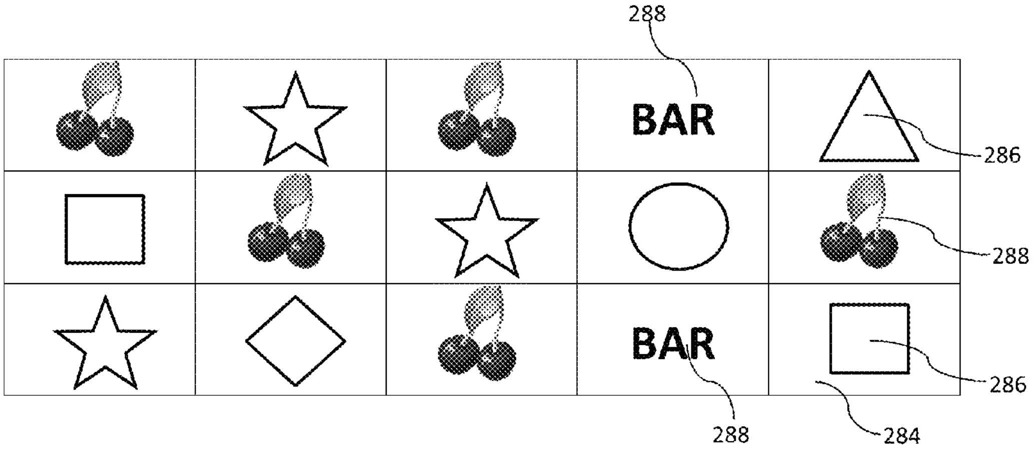
FIG. 10 is a diagrammatic representation of example symbols displayed to a player during implementation by the gaming system of a feature game.

As shown in FIG. 10, the symbol selector 20 selects symbols from each of the reel strips incorporating the base symbols 14 and the additional symbols, in the present example by selecting stopping positions of the 5 reels 280. The reels then spin and are subsequently controlled by the reel controller 21 to stop such that selected base symbols 286 and the selected additional symbols 288 are displayed. The displayed selected base symbols 286 and feature symbols 288 are then evaluated by the outcome evaluator 28 and if the displayed base and feature symbols 286, 288 correspond to a winning outcome, a prize is awarded by the prize allocator 29.

In an alternative embodiment, instead of selecting a symbol pattern that is to be added to a pool of base symbols, the gaming system may be arranged to remove a defined symbol pattern from a pool of base symbols.

With this arrangement, the resulting reel strips to be used to determine a game outcome would comprise less symbols than the original reel strips, and the resultant win outcome probabilities will thereby be modified according to the remaining base symbols.

As with the previous embodiments wherein additional symbols in a selected symbol pattern are added to base symbols, the symbol patterns of the present embodiment may be constituted and selected in a similar way.

For example, a plurality of symbol patterns may be provided, the type, number and locations of symbols in the symbol patterns may be varied, win outcome probabilities for the symbol patterns may be varied, and symbol patterns may be selected in a similar way to the symbol patterns of the above embodiments.

While the above embodiments are described in relation to an implementation having a base game and a feature game that is implemented when a trigger condition occurs during a base game, it will be understood that a variation wherein only one type of game is implemented is envisaged.

with this implementation, at some stage during the game additional symbols are added to a set of base symbols or a defined set of removable symbols are removed from the base symbols and the remaining symbols used to select the symbols for display and subsequent evaluation.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are determined to be within the scope of the present invention.

The invention claimed is:

1. A gaming system for play of a game, comprising:
- a display having a display area for play of a game;
- a credit input mechanism to enable input of credit for wagering on the play of the game; and
- a game controller, said game controller comprising:
  - a base set of base symbols, each base symbol having a predefined location in said base set relative to others of said base symbols; and
  - a second set of additional symbols, the second set of additional symbols including a predefined number of additional symbols;
- and wherein the game controller is configured
  - to incorporate the additional symbols of the second set into the base set by adding the predefined number of said additional symbols to the base set relative to a selected location in said base set so as to define a combined symbol set,
  - to select from the combined symbol set a plurality of symbols for a game outcome,
  - to display in the display area symbols from the combined symbol set for play of the game, and
  - to display a game outcome based on the selected symbols from the combined symbol set.

2. A gaming system as claimed in claim 1, wherein the additional symbols of the second set of additional symbols are randomly determined.

3. A gaming system as claimed in claim 1, wherein the additional symbols of the second set of additional symbols are determined according to at least one game condition.

4. A gaming system as claimed in claim 1, wherein the additional symbols of the second set of additional symbols are determined according to a wager amount.

5. A gaming system as claimed in claim 1, wherein the second set of additional symbols includes a plurality of different symbol types.

6. A gaming system as claimed in claim 1, wherein the second set of additional symbols includes a plurality of symbol groups, each symbol group being associated with a symbol reel, and each symbol group including at least one of the same additional symbol.

7. A gaming system as claimed in claim 6, wherein at least one symbol group includes a plurality of a first symbol type, and at least one other symbol group includes a plurality of a second symbol type.

8. A gaming system as claimed in claim 6, wherein at least some symbol groups include differing numbers of additional symbols.

9. A gaming system as claimed in claim 1, wherein the second set of additional symbols includes a plurality of symbol groups; and wherein the additional symbols in the second set of additional symbols are defined according to desired conditional probability chains between symbol groups that produce desired win probability outcomes.

10. A gaming system as claimed in claim 1, wherein the system is arranged to incorporate the additional symbols into the set of base symbols by adding the additional symbols of the at least one set of additional symbols to the base set.

11. A gaming system as claimed in claim 10, wherein each additional symbol added to the base set is disposed between two base symbols in the base set.

12. A gaming system as claimed in claim 1, wherein the second set of additional symbols comprises a symbol pattern defining the intended location of additional symbols relative to the base symbols in the base set.

13. A gaming system as claimed in claim 12, wherein the system comprises a third set of additional symbols, each said second set and said third set configured of additional symbols, said second set comprising a different symbol pattern than said third set, and wherein the game controller is configured to select at least one of the second set and third set of additional symbols to be incorporated into the base set of base symbols.

14. A gaming system as claimed in claim 13, wherein second and third sets of additional symbols correspond to different win outcome probabilities.

15. A gaming system as claimed in claim 13, wherein the game controller is configured to randomly select one of said second and third sets of additional symbols.

16. A gaming system as claimed in claim 13, wherein the game controller is configured to select one of said second and third sets of additional symbols using a weighted table.

17. A gaming system as claimed in claim 16, wherein the gaming system includes a plurality of weighted tables; and wherein the game controller is configured to select a first weighted table to use to select on of said second and said third sets of additional symbols.

18. A gaming system as claimed in claim 17, wherein a plurality of games are implemented by the gaming system; and wherein the game controller is configured to select a first weighted table to use for a first game, and to select at least one different weighted table for use in a subsequent game.

19. A gaming system as claimed in claim 1, wherein the game controller is configured to implement a base game using the base set of base symbols, and to implement a feature game wherein the additional symbols from the second set of additional symbols are incorporated into the base set of base symbols so as to define a combined symbol set; and wherein the game controller is configured to select and display a plurality of symbols from the combined symbol set.

20. A method of gaming using a display having a display area, a credit input mechanism to enable input of credit for wagering on play of a game, a game controller having a base set of base symbols and a second set of additional symbols, comprising:

arranging said base symbols in said base set to associate each said base symbol with a predefined location in said base set;

defining a predetermined number of said additional symbols of the second set;

incorporating the additional symbols of the second set into the base set so as to define a combined symbol set, said incorporating including adding the additional symbols relative to a selected location in the base set;

selecting from the combined symbol set a plurality of symbols for a game outcome;

displaying in the display area symbols from the combined symbol set for play of the game; and a displaying the game outcome based on the selected symbols from the combined symbol set.

21. A method as claimed in claim 20, and further comprising randomly determining the additional symbols of the second set.

22. A method as claimed in claim 20, and further comprising determining the additional symbols of the second set according to at least one game condition.

23. A method as claimed in claim 20, and further comprising determining the additional symbols of the second set according to a wager amount.

24. A method as claimed in anyone of claim 20, wherein the second set includes a plurality of different symbol types.

25. A method as claimed in claim 20, wherein the second set includes a plurality of symbol groups, each symbol group being associated with a symbol reel, and each symbol group including at least one of the same additional symbol.

26. A method as claimed in claim 25, wherein at least one symbol group includes a plurality of a first symbol type, and at least one other symbol group includes a plurality of a second symbol type.

27. A method as claimed in claim 25, wherein at least some symbol groups include differing numbers of additional symbols.

28. A method as claimed in claim 25, comprising defining the additional symbols in the second set according to desired conditional probability chains between symbol groups that produce desired win probability outcomes.

29. A method as claimed in claim 20, and further comprising incorporating a plurality of the same additional symbol into the base symbol set by adding the plurality of the same additional symbol to the base set.

30. A method as claimed in claim 29, comprising adding the plurality of the same additional symbol to the base set between two base symbols in the base set.

31. A method as claimed in claim 20, wherein the second set comprises a symbol pattern defining type and number of additional symbols and intended location of additional symbols relative to the base set.

32. A method as claimed in claim 31, comprising providing a plurality of additional symbol sets, each additional symbol set comprising a different symbol pattern, and selecting at least one of the additional symbol sets to thereby define the additional symbols to be incorporated into the base set.

33. A method as claimed in claim 32, wherein at least some of the plurality of additional symbol sets correspond to different win outcome probabilities.

34. A method as claimed in claim 32, comprising randomly selecting an additional symbol set from the plurality of additional symbol sets.

35. A gaming system as claimed in claim 32, comprising selecting an additional symbol set from the plurality of additional symbol sets using a weighted table.

36. A gaming system as claimed in claim 35, and further using a plurality of weighted tables; and wherein said selecting an additional symbol set includes selecting one of the weighted tables to use in said selecting.

37. A gaming system as claimed in claim 36, comprising implementing a plurality of games, selecting a first weighted table to use for a first game, and selecting at least one different weighted table for use in subsequent games.

38. A gaming system as claimed in claim 20, and further comprising implementing a base game using the base symbol set; and implementing a feature game using said combined symbol set.

39. The gaming system of claim 1 and further comprising a plurality of second sets, and wherein each of said second sets has a predefined number of a single type of symbol, and wherein each of said second sets has a type of symbol different than the type of symbol in the other of said second sets; and wherein the game controller is configured to incorporated one of said plurality of second sets into the base set.

40. The gaming system of claim 39 wherein said game controller is configured to randomly select said one of said plurality of second sets to be incorporated in the base set.

41. The gaming system of claim 39 wherein said game controller comprises a weighting table; and wherein said game controller is configured to use said weighting table to select said one of said plurality of second sets to be incorporated into the base set.

* * * * *